(12) United States Patent
Meng et al.

(10) Patent No.: US 12,013,740 B2
(45) Date of Patent: Jun. 18, 2024

(54) TOUCH DISPLAY DEVICE AND POWER SUPPLY CONTROL METHOD

(71) Applicants: Beijing BOE Optoelectronics Technology Co., Ltd., Beijing (CN); BOE Technology Group Co., Ltd., Beijing (CN)

(72) Inventors: Zhaohui Meng, Beijing (CN); Wei Sun, Beijing (CN); Lin Cong, Beijing (CN); Cuilan Huang, Beijing (CN); Jingpeng Zhao, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 98 days.

(21) Appl. No.: 17/789,172

(22) PCT Filed: Sep. 14, 2021

(86) PCT No.: PCT/CN2021/118244
§ 371 (c)(1),
(2) Date: Jun. 25, 2022

(87) PCT Pub. No.: WO2022/083360
PCT Pub. Date: Apr. 28, 2022

(65) Prior Publication Data
US 2023/0032344 A1 Feb. 2, 2023

(30) Foreign Application Priority Data
Oct. 22, 2020 (CN) .......................... 202011138409.1

(51) Int. Cl.
*G06F 1/3234* (2019.01)
*G06F 1/3231* (2019.01)
*G06F 1/3296* (2019.01)
*G06F 3/041* (2006.01)

(52) U.S. Cl.
CPC .......... *G06F 1/3262* (2013.01); *G06F 1/3231* (2013.01); *G06F 1/3265* (2013.01); *G06F 1/3296* (2013.01); *G06F 3/0416* (2013.01)

(58) Field of Classification Search
CPC .... G06F 1/3262; G06F 1/3231; G06F 1/3265; G06F 1/3296; G06F 3/0416
See application file for complete search history.

(56) References Cited

U.S. PATENT DOCUMENTS

| 5,578,957 A | 11/1996 | Erhart et al. |
| 7,196,537 B2 | 3/2007 | Von Campenhausen et al. |

(Continued)

FOREIGN PATENT DOCUMENTS

| CN | 105929994 A | 9/2016 |
| CN | 106383611 A | 2/2017 |

(Continued)

OTHER PUBLICATIONS

PCT/CN2021/118244 international search report and written opinion.
CN202011138409.1 first office action.

*Primary Examiner* — Glenn A. Auve
(74) *Attorney, Agent, or Firm* — IPro, PLLC (57) ABSTRACT

Touch display device and power supply control method are provided. The touch display device includes power supply module including: power supply control circuit; power management chip provides touch operation processing circuit, touch display control driver circuit and touch integrated circuit with operating voltage; the touch operation processing circuit provides first control signal to control signal output terminal when the touch display device is in sleep-state, to enable the power supply control circuit to supply power to the power management chip via second power supply terminal under control of the first control signal; and provides second control signal to the control signal output (Continued)

terminal when the touch display device is in the sleep-state and the touch display panel is touched, to enable the power supply control circuit to supply power to the power management chip via first power supply terminal under control of the second control signal.

15 Claims, 3 Drawing Sheets

(56) References Cited

U.S. PATENT DOCUMENTS

| | | | |
|---|---|---|---|
| 10,572,270 | B1 | 2/2020 | Sampath et al. |
| 2003/0001548 | A1 | 1/2003 | Feldtkeller |
| 2011/0242043 | A1* | 10/2011 | Yarvis ............... H04W 52/0251 |
| | | | 345/177 |
| 2017/0148390 | A1* | 5/2017 | Park ...................... G06F 1/3296 |
| 2017/0153690 | A1 | 6/2017 | Chen et al. |
| 2018/0095521 | A1* | 4/2018 | Tadinada ............ G06F 3/04166 |
| 2018/0301109 | A1* | 10/2018 | Liu .......................... G09G 5/00 |
| 2020/0166884 | A1 | 5/2020 | Kadota et al. |
| 2020/0363862 | A1* | 11/2020 | Krah .................... G06F 1/3215 |
| 2021/0149474 | A1* | 5/2021 | Choi ........................ G09G 3/20 |

FOREIGN PATENT DOCUMENTS

| | | | |
|---|---|---|---|
| CN | 108762560 | A | 11/2018 |
| CN | 109166546 | A | 1/2019 |
| CN | 112130701 | A | 12/2020 |

* cited by examiner

TOUCH DISPLAY DEVICE AND POWER SUPPLY CONTROL METHOD

CROSS-REFERENCE TO RELATED APPLICATIONS

The present application is the U.S. national phase of PCT Application No. PCT/CN2021/118244 filed on Sep. 14, 2021, which claims priority to Chinese Patent Application No. 202011138409.1 filed in China on Oct. 22, 2020, the disclosure of which is hereby incorporated by reference in its entirety.

TECHNICAL FIELD

The present disclosure relates to the technical field of touch display control, and in particular, to a touch display device and a power supply control method.

BACKGROUND

In the related art, solutions for waking up a large-sized touch display device in a sleep state only include moving a mouse, using a keyboard, touching remote controller or using a wake-up switch and the like, and the wake-up by touching has not been achieved yet. In the large-sized touch display device, there are various independent chips, such as a power management chip, a timing controller chip, a touch power supply chip, a touch computing chip, a display screen driver chip and the like, which are not integrated as one chip, so it would be difficult to design a logic function for the wake-up by touching. Because there are a variety of different operating voltages and these circuits operate separately and influence with each other, a large number of peripheral power chips that are individually controlled by transistors need to be added to provide a touch control monitoring function under the sleep state, resulting in a complex structure, increased manufacturing cost, as well as risks in design and usage.

In addition, for the large-sized touch display device, a system operating voltage is provided after the power is off in the sleep state based on an existing eDP (enhanced device) protocol, so that a touch event cannot be detected and the wake-up by touching function cannot be provided under the sleep state.

SUMMARY

In a first aspect, an embodiment of the present disclosure provides a touch display device, including a touch display panel, a touch display control driver circuit, a touch integrated circuit, a power management chip, and a touch operation processing circuit, the touch display device further includes a power supply module; the power supply module includes a first power supply terminal, a second power supply terminal, and a power supply control circuit;

where the power management chip provides the touch operation processing circuit, the touch display control driver circuit and the touch integrated circuit with an operating voltage;

a control terminal of the power supply control circuit is electrically connected to a control signal output terminal of the touch operation processing circuit;

the touch operation processing circuit is configured for providing a first control signal to the control signal output terminal when the touch display device is in a sleep state, to enable the power supply control circuit to supply power to the power management chip via the second power supply terminal under control of the first control signal; and the touch operation processing circuit is further configured for providing a second control signal to the control signal output terminal when the touch display device is in the sleep state and the touch display panel is touched, to enable the power supply control circuit to supply power to the power management chip via the first power supply terminal under control of the second control signal.

Optionally, the first power supply terminal is configured for providing a voltage signal of 0 V when the touch display device is in the sleep state; the touch display device further includes a system terminal;

the touch operation processing circuit is configured for providing a wake-up prompt signal to the system terminal when the touch display device is in the sleep state and the touch display panel is touched; and the system terminal controls the first power supply terminal to provide a first operating voltage upon reception of the wake-up prompt signal.

Optionally, the touch operation processing circuit is further configured for providing the second control signal to the control signal output terminal when the touch display device is in a normal operating state, to enable the power supply control circuit to supply power to the power management chip via the first power supply terminal under control of the second control signal.

Optionally, the power supply control circuit includes a first resistor, a second resistor, a third resistor, a first control circuit, a second control circuit, a third control circuit, and a fourth control circuit, wherein, a control terminal of the first control circuit is electrically connected to the control signal output terminal; a first terminal of the first control circuit is electrically connected to a control terminal of the second control circuit, a control terminal of the third control circuit and a first terminal of the first resistor; a second terminal of the first resistor is electrically connected to the second power supply terminal; a second terminal of the first control circuit is electrically connected to a first voltage terminal; the first control circuit is configured for controlling the control terminal of the second control circuit to be connected to the first voltage terminal, and controlling the control terminal of the third control circuit to be connected to the first voltage terminal when the control signal output terminal outputs the first control signal; the first control circuit is further configured for controlling the control terminal of the second control circuit to be disconnected from the first voltage terminal and controlling the control terminal of the third control circuit to be disconnected from the first voltage terminal when the control signal output terminal outputs the second control signal;

a first terminal of the second control circuit is electrically connected to the second power supply terminal, a second terminal of the second control circuit is electrically connected to a control terminal of the fourth control circuit, and the second terminal of the second control circuit is electrically connected to a second voltage terminal via the second resistor, the second control circuit is configured for controlling the second power supply terminal to be connected to the control terminal of the fourth control circuit when the control terminal of the second control circuit is in connection with the first voltage terminal, and the second control circuit is further configured for controlling the second power supply terminal to be disconnected from the control terminal of the fourth control circuit when the control terminal of the second control circuit is disconnected from the first voltage terminal;

a first terminal of the third control circuit is electrically connected to the second power supply terminal, and a second terminal of the third control circuit is electrically connected to the power management chip via the third resistor, the third control circuit is configured for controlling to supply power to the power management chip via the second power supply terminal when the control terminal of the third control circuit is in connection with the first voltage terminal, and the third control circuit is further configured for controlling the second power supply terminal to be disconnected from the power management chip when the control terminal of the third control circuit is disconnected from the first voltage terminal; and a first terminal of the fourth control circuit is electrically connected to the first power supply terminal, and a second terminal of the fourth control circuit is electrically connected to the power management chip via the third resistor, the fourth control circuit is configured for controlling the first power supply terminal to be disconnected from the power management chip when the control terminal of the fourth control circuit is electrically connected to the second power supply terminal, and the fourth control circuit is further configured for controlling to supply power to the power management chip via the first power supply terminal when the control terminal of the fourth control circuit is disconnected from the second power supply terminal.

Optionally, the first control circuit includes a first control transistor and a first control resistor;

a control terminal of the first control transistor is electrically connected to the control signal output terminal, and a first electrode of the first control transistor is electrically connected to the control terminal of the second control circuit, the control terminal of the third control circuit and the first terminal of the first resistor; and a second electrode of the first control transistor is electrically connected to the first voltage terminal.

Optionally, the second control circuit includes a second control transistor; and a control electrode of the second control transistor is electrically connected to the first terminal of the first control circuit, a first electrode of the second control transistor is electrically connected to the second power supply terminal, a second electrode of the second control transistor is electrically connected to the control terminal of the fourth control circuit, and the second electrode of the second control transistor is electrically connected to the second voltage terminal via the second resistor.

Optionally, the third control circuit includes a third control transistor; and a control electrode of the third control transistor is electrically connected to the first terminal of the first control circuit, a first electrode of the third control transistor is electrically connected to the second power supply terminal, and a second electrode of the third control transistor is electrically connected to the power management chip via the third resistor.

Optionally, the fourth control circuit includes a fourth control transistor and a fifth control transistor, wherein a control electrode of the fourth control transistor and a control electrode of the fifth control transistor are electrically connected to the second terminal of the second control circuit; a first electrode of the fourth control transistor is electrically connected to the first power supply terminal, a second electrode of the fourth control transistor is electrically connected to a first electrode of the fifth control transistor, and a second electrode of the fifth control transistor is electrically connected to the power management chip via the third resistor.

Optionally, the touch display device according to at least one embodiment of the present disclosure further includes a timing controller; and the touch operation processing circuit and the timing controller are integrated on a single chip.

In a second aspect, an embodiment of the present disclosure further provides a power supply control method, applied to the touch display device as described above, the power supply control method includes:

providing, by a power management chip, an operating voltage to a touch operation processing circuit, a touch display control driver circuit and a touch integrated circuit;

providing, by the touch operation processing circuit, a first control signal to a control signal output terminal when the touch display device is in a sleep state, to enable a power supply control circuit to supply power to the power management chip via a second power supply terminal under control of the first control signal; and providing, by the touch operation processing circuit, a second control signal to the control signal output terminal when the touch display device is in the sleep state and the touch display panel is touched, to enable the power supply control circuit to supply power to the power management chip via a first power supply terminal under control of the second control signal.

Optionally, the touch display device further includes a system terminal, and the power supply control method further includes:

providing, by the first power supply terminal, a voltage signal of 0 V when the touch display device is in the sleep state;

providing, by the touch operation processing circuit, a wake-up prompt signal to the system terminal when the touch display device is in the sleep state and the touch display panel is touched; and controlling, by the system terminal, the first power supply terminal to provide a first operating voltage upon reception of the wake-up prompt signal.

Optionally, according to at least one embodiment of the present disclosure, the power supply control method further includes:

providing, by the touch operation processing circuit, the second control signal to the control signal output terminal when the touch display device is in a normal operating state, to enable the power supply control circuit to supply power to the power management chip via the first power supply terminal under control of the second control signal.

DETAILED DESCRIPTION

Embodiments of the present disclosure will now be described more clearly hereinafter with reference to the accompanying drawings, in which some, but not all embodiments of the disclosure are illustrated. Based on the embodiments in the present disclosure, all other embodiments obtained by a person of ordinary skill in the art without inventive effort fall within the scope of the present disclosure.

The transistor used in all the embodiments of the present disclosure may be a triode, a thin film transistor or a field effect transistor, or other devices with the same characteristics. In embodiments of the present disclosure, to distinguish two electrodes of the transistor other than the control electrode, one of the two electrodes is referred to as a first electrode while the other one is referred to as a second electrode.

In practical operation, in a case where the transistor is a triode, the control electrode may be the base electrode, the first electrode may be the collector electrode, and the second electrode may be the emitter electrode. Alternatively, the control electrode may be the base electrode, the first electrode may be the emitter electrode, and the second electrode may be the collector electrode.

In practical operation, in a case where the transistor is a thin film transistor or a field effect transistor, the control electrode may be the gate electrode, the first electrode may be the drain electrode, and the second electrode may be the source electrode. Alternatively, the control electrode may be the gate electrode, the first electrode may the source electrode, and the second electrode may be the drain electrode.

Figure 1:
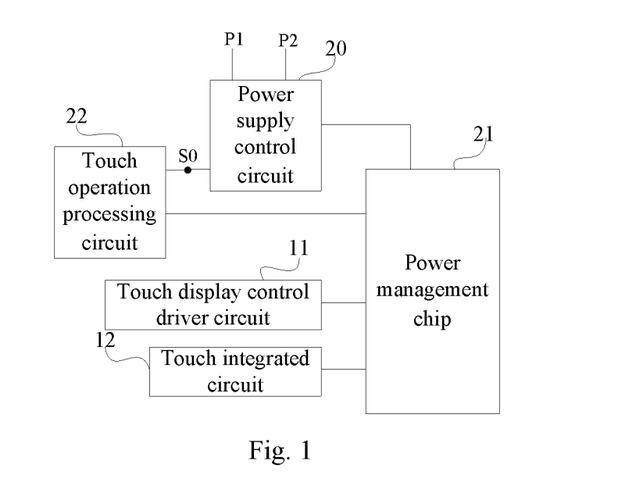
FIG. 1 is a structural diagram of a touch display device according to at least one embodiment of the present disclosure.

As shown in FIG. 1, according to at least one embodiment of the present disclosure, a touch display device includes a touch display panel, a touch display control driver circuit 11, a touch integrated circuit 12, a power management chip 21, and a touch operation processing circuit 22, and the touch display device further includes a power supply module; the power supply module including a first power supply terminal P1, a second power supply terminal P2, and a power supply control circuit 20;

where the power management chip 21 provides the touch operation processing circuit 22, the touch display control driver circuit 11 and the touch integrated circuit 12 with an operating voltage;

a control terminal of the power supply control circuit 20 is electrically connected to a control signal output terminal S0 of the touch operation processing circuit 22;

the touch operation processing circuit 22 is electrically connected to the first power supply terminal P1, the second power supply terminal P2, the control signal output terminal S0 and the power management chip 21; the touch operation processing circuit 22 is configured for providing a first control signal to the control signal output terminal S0 when the touch display device is in a sleep state, to enable the power supply control circuit 20 to supply power to the power management chip 21 via the second power supply terminal P2 under control of the first control signal; and the touch operation processing circuit 22 is further configured for providing a second control signal to the control signal output terminal S0 when the touch display device is in the sleep state and the touch display panel is touched, to enable the power supply control circuit 20 to supply power to the power management chip 21 via the first power supply terminal P1 under control of the second control signal.

In the touch display device according to at least one embodiment of the present disclosure, the power supply scheme is simplified, and the quantity of external power supplies (only the first power supply terminal and the second power supply terminal are used according to at least one embodiment of the present disclosure) is reduced. The power supply control circuit 20 is used to control, when the touch display device is in the sleep state, to supply power to the power management chip 21 via the second power supply terminal P2. The power management chip 21 provides an operating voltage for the touch display control driver circuit 11, the touch integrated circuit 12 and the touch operation processing circuit 22 (the touch display control driver circuit 11, the touch integrated circuit 12 and the touch operation processing circuit 22 can perform a touch event detection). In this way, a touch event can be detected even if the touch display device is in the sleep state, so that the wake-up by touching under the sleep state can be achieved with less external power supply and devices being used, the operation is convenient and the device structure is simple.

In particular implementation, the touch display control driver circuit 11 may be specifically configured for providing a touch control driving signal to a touch control driving electrode included in the touch display panel, receiving a touch sensing signal fed back by a touch sensing electrode included in the touch display panel, and determining whether there is a touch event according to the touch sensing signal.

The touch integrated circuit 12 may be specifically configured for providing a first modulated voltage signal and a second modulated voltage signal to the touch display control driver circuit 11;

where the first modulated voltage signal is a voltage signal obtained by superimposing a pulse signal on a common electrode voltage signal, and the second modulated voltage signal is a voltage signal obtained by superimposing a pulse signal on a low voltage signal, but the present disclosure is not limited thereto.

In at least one embodiment of the present disclosure, the first power supply terminal P1 is a power supply terminal for providing an operating voltage to the touch display device when the touch display device is operating normally.

Optionally, the second power supply terminal may be a USB (Universal Serial Bus) power supply terminal, but the present disclosure is not limited thereto.

In particular implementation, the first power supply terminal is configured for providing a voltage signal of 0 V when the touch display device is in the sleep state; and the touch display device further includes a system terminal;

the touch operation processing circuit is configured for providing a wake-up prompt signal to the system terminal when the touch display device is in the sleep state and the touch display panel is touched; and the system terminal controls the first power supply terminal to provide a first operating voltage upon reception of the wake-up prompt signal.

In at least one embodiment of the present disclosure, when the touch display device is in the sleep state, the first power supply terminal does not work, and the first power supply terminal provides the voltage signal of 0 V; when waking up the touch display device in the sleep state by touching, the touch operation processing circuit provide the system terminal with the wake-up prompt signal; and in response to the wake-up prompt signal, the system terminal control the first power supply terminal to provide the first operating voltage normally.

In at least one embodiment of the present disclosure, the system terminal is a board card with a windows operating system provided by the complete machine factory.

Optionally, the touch operation processing circuit is further configured for providing the second control signal to the control signal output terminal when the touch display device is in a normal operating state, to enable the power supply control circuit to supply power to the power management chip via the first power supply terminal under control of the second control signal.

In particular implementation, when the touch display device is in the normal operating state, the touch operation processing circuit may provide the second control signal, such that under control of the second control signal, the power supply control circuit is controlled to supply power to the power management chip via the first power supply terminal.

In at least one embodiment of the present disclosure, the touch display device in the normal operating state refers to: the touch display device performs the displaying and touch controlling normally.

In at least one embodiment of the present disclosure, the power supply control circuit includes a first resistor, a second resistor, a third resistor, a first control circuit, a second control circuit, a third control circuit, and a fourth control circuit, wherein, a control terminal of the first control circuit is electrically connected to the control signal output terminal; a first terminal of the first control circuit is electrically connected to a control terminal of the second control circuit, a control terminal of the third control circuit and a first terminal of the first resistor; a second terminal of the first resistor is electrically connected to the second power supply terminal; a second terminal of the first control circuit is electrically connected to a first voltage terminal; the first control circuit is configured for controlling the control terminal of the second control circuit to be connected to the first voltage terminal, and controlling the control terminal of the third control circuit to be connected to the first voltage terminal when the control signal output terminal outputs the first control signal; the first control circuit is further configured for controlling the control terminal of the second control circuit to be disconnected from the first voltage terminal and controlling the control terminal of the third control circuit to be disconnected from the first voltage terminal when the control signal output terminal outputs the second control signal;

a first terminal of the second control circuit is electrically connected to the second power supply terminal, a second terminal of the second control circuit is electrically connected to a control terminal of the fourth control circuit, and the second terminal of the second control circuit is electrically connected to a second voltage terminal via the second resistor, the second control circuit is configured for controlling the second power supply terminal to be connected to the control terminal of the fourth control circuit when the control terminal of the second control circuit is in connection with the first voltage terminal, and the second control circuit is further configured for controlling the second power supply terminal to be disconnected from the control terminal of the fourth control circuit when the control terminal of the second control circuit is disconnected from the first voltage terminal;

a first terminal of the third control circuit is electrically connected to the second power supply terminal, and a second terminal of the third control circuit is electrically connected to the power management chip via the third resistor, the third control circuit is configured for controlling to supply power to the power management chip via the second power supply terminal when the control terminal of the third control circuit is in connection with the first voltage terminal, and the third control circuit is further configured for controlling the second power supply terminal to be disconnected from the power management chip when the control terminal of the third control circuit is disconnected from the first voltage terminal; and a first terminal of the fourth control circuit is electrically connected to the first power supply terminal, and a second terminal of the fourth control circuit is electrically connected to the power management chip via the third resistor, the fourth control circuit is configured for controlling the first power supply terminal to be disconnected from the power management chip when the control terminal of the fourth control circuit is electrically connected to the second power supply terminal, and the fourth control circuit is further configured for controlling to supply power to the power management chip via the first power supply terminal when the control terminal of the fourth control circuit is disconnected from the second power supply terminal.

In at least one embodiment of the present disclosure, the power supply control circuit may include the first control circuit, the second control circuit, the third control circuit and the fourth control circuit, so that the power supply control circuit 20 can supply power to the power management chip 21 via the second power supply terminal P2 under control of the first control signal, and the power supply control circuit 20 can supply power to the power management chip 21 via the first power supply terminal P1 under control of the second control signal.

In at least one embodiment of the present disclosure, the first voltage terminal V1 may be a low voltage terminal or a ground terminal, and the second voltage terminal V2 may be a low voltage terminal or a ground terminal, but the present disclosure is not limited thereto.

Figure 2:
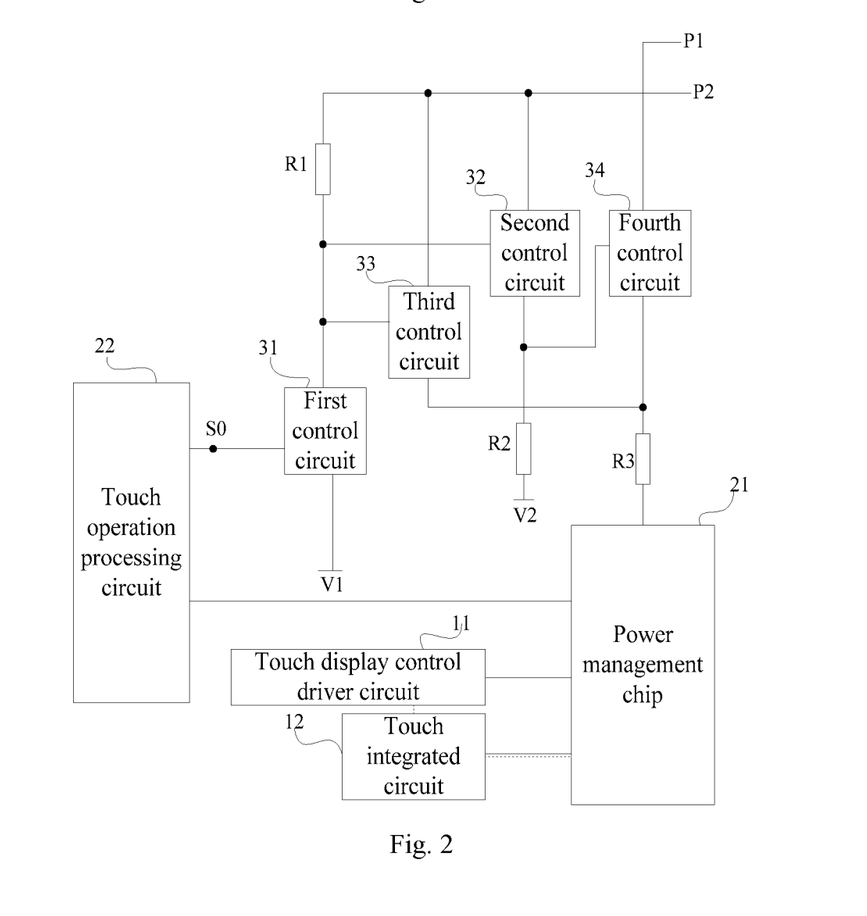
FIG. 2 is a structural diagram of a touch display device according to at least one embodiment of the present disclosure.

As shown in FIG. 2, on the basis of the touch display device according to at least one embodiment as shown in FIG. 1, the power supply control circuit includes a first resistor R1, a second resistor R2, a third resistor R3, a first control circuit 31, a second control circuit 32, a third control circuit 33 and a fourth control circuit 34, where, a control terminal of the first control circuit 31 is electrically connected to the control signal output terminal S0, a first terminal of the first control circuit 31 is electrically connected to a control terminal of the second control circuit 32, a control terminal of the third control circuit 33 and a first terminal of a first resistor R1, and a second terminal of the first resistor R1 is electrically connected to the second power supply terminal P2; a second terminal of the first control circuit 31 is electrically connected to a first voltage terminal V1; the first control circuit 31 is configured for controlling the control terminal of the second control circuit 32 to be connected to the first voltage terminal V1, and controlling the control terminal of the third control circuit 33 to be connected to the first voltage terminal V1 when the control signal output terminal S0 outputs the first control signal; the first control circuit 31 is further configured for controlling the control terminal of the second control circuit 32 to be disconnected from the first voltage terminal V1, and controlling the control terminal of the third control circuit 33 to be disconnected from the first voltage terminal V1 when the control signal output terminal S0 outputs the second control signal;

a first terminal of the second control circuit 32 is electrically connected to the second power supply terminal P2, a second terminal of the second control circuit 32 is electrically connected to a control terminal of the fourth control circuit 34, and the second terminal of the second control circuit 32 is electrically connected to a second voltage terminal V2 via the second resistor R2, the second control circuit 32 is configured for controlling the second power supply terminal P2 to be connected to the control terminal of the fourth control circuit 34 when the control terminal of the second control circuit is in connection with the first voltage terminal V1, and the second control circuit 32 is further configured for controlling the second power supply terminal P2 to be disconnected from the control terminal of the fourth control circuit 34 when the control terminal of the second control circuit 32 is disconnected from the first voltage terminal V1;

a first terminal of the third control circuit 33 is electrically connected to the second power supply terminal P2, and a second terminal of the third control circuit 33 is electrically connected to the power management chip 21 via the third resistor R3, the third control circuit 33 is configured for controlling to supply power to the power management chip 21 via the second power supply terminal P2 when the control terminal of the third control circuit is in connection with the first voltage terminal V1, and the third control circuit 33 is further configured for controlling the second power supply terminal P2 to be disconnected from the power management chip 21 when the control terminal of the third control circuit is disconnected from the first voltage terminal V1;

a first terminal of the fourth control circuit 34 is electrically connected to the first power supply terminal P1, and a second terminal of the fourth control circuit 34 is electrically connected to the power management chip 21 via the third resistor R3, the fourth control circuit 34 is configured for controlling the first power supply terminal P1 to be disconnected from the power management chip 21 when the control terminal of the fourth control circuit is electrically connected to the second power supply terminal P2, and the fourth control circuit 34 is further configured for controlling to supply power to the power management chip 21 via the first power supply terminal P1 when the control terminal of the fourth control circuit is disconnected from the second power supply terminal P2.

When the touch display device according to at least one embodiment of the present disclosure as shown in FIG. 2 is in operation, and in a case where the control signal output terminal S0 outputs the first control signal, the first control circuit 31 controls the control terminal of the second control circuit 32 to be connected to the first voltage terminal V1, and controls the control terminal of the third control circuit 33 to be connected to the first voltage terminal V1; the second control circuit 32 controls the second power supply terminal P2 to be connected to the control terminal of the fourth control circuit 34, and the fourth control circuit 34 controls the first power supply terminal P1 to be disconnected from the power management chip 21; the third control circuit 33 controls to supply power to the power management chip 21 by the second power supply terminal P2.

In a case where the control signal output terminal S0 outputs the second control signal, the first control circuit 31 controls the control terminal of the second control circuit 32 to be disconnected from the first voltage terminal V1, and controls the control terminal of the third control circuit 33 to be disconnected from the first voltage terminal V1; the second control circuit 32 controls the second power supply terminal P2 to be disconnected from the control terminal of the fourth control circuit 34; the third control circuit 33 controls the second power supply terminal P2 to be disconnected from the power management chip 21; and the fourth control circuit 34 controls to supply power to the power management chip 21 via the first power supply terminal P1.

In at least one embodiment shown in FIG. 2, a control diode may also be provided between P1 and the fourth control circuit 34, an anode of the control diode is electrically connected to P1, and a cathode of the control diode is electrically connected to the fourth control circuit 34, but the present disclosure is not limited thereto.

Optionally, the first control circuit incudes a first control transistor and a first control resistor;
  a control terminal of the first control transistor is electrically connected to the control signal output terminal, and a first electrode of the first control transistor is electrically connected to the control terminal of the second control circuit, the control terminal of the third control circuit and the first terminal of the first resistor; and a second electrode of the first control transistor is electrically connected to the first voltage terminal.

In particular implementation, the first control transistor may be an NPN-type triode, but the present disclosure is not limited thereto.

Optionally, the second control circuit includes a second control transistor; and
  a control electrode of the second control transistor is electrically connected to the first terminal of the first control circuit, a first electrode of the second control transistor is electrically connected to the second power supply terminal, a second electrode of the second control transistor is electrically connected to the control terminal of the fourth control circuit, and the second electrode of the second control transistor is electrically connected to the second voltage terminal via the second resistor.

In particular implementation, the second control transistor may be a PNP-type triode, but the present disclosure is not limited thereto.

Optionally, the third control circuit includes a third control transistor; and
  a control electrode of the third control transistor is electrically connected to the first terminal of the first control circuit, a first electrode of the third control transistor is electrically connected to the second power supply terminal, and a second electrode of the third control transistor is electrically connected to the power management chip via the third resistor.

In particular implementation, the third control transistor may be a PMOS transistor (a P-type metal-oxide-semiconductor transistor), but the present disclosure is not limited thereto.

Optionally, the fourth control circuit includes a fourth control transistor and a fifth control transistor, a control electrode of the fourth control transistor and a control electrode of the fifth control transistor are electrically connected to the second terminal of the second control circuit; a first electrode of the fourth control transistor is electrically connected to the first power supply terminal, a second electrode of the fourth control transistor is electrically connected to a first electrode of the fifth control transistor, and a second electrode of the fifth control transistor is electrically connected to the power management chip via the third resistor.

In particular implementation, the fourth control transistor and the fifth control transistor may be PMOS transistors (P-type metal-oxide-semiconductor transistors), but the present disclosure is not limited thereto.

In particular implementation, according to at least one embodiment of the present disclosure, the touch display device further includes a timing controller; and the touch operation processing circuit and the timing controller are integrated on a single chip.

In at least one embodiment of the present disclosure, the touch operation processing circuit and the timing controller may be integrated on a single chip, so as to reduce the quantity of chips used in the touch display device.

Figure 3:
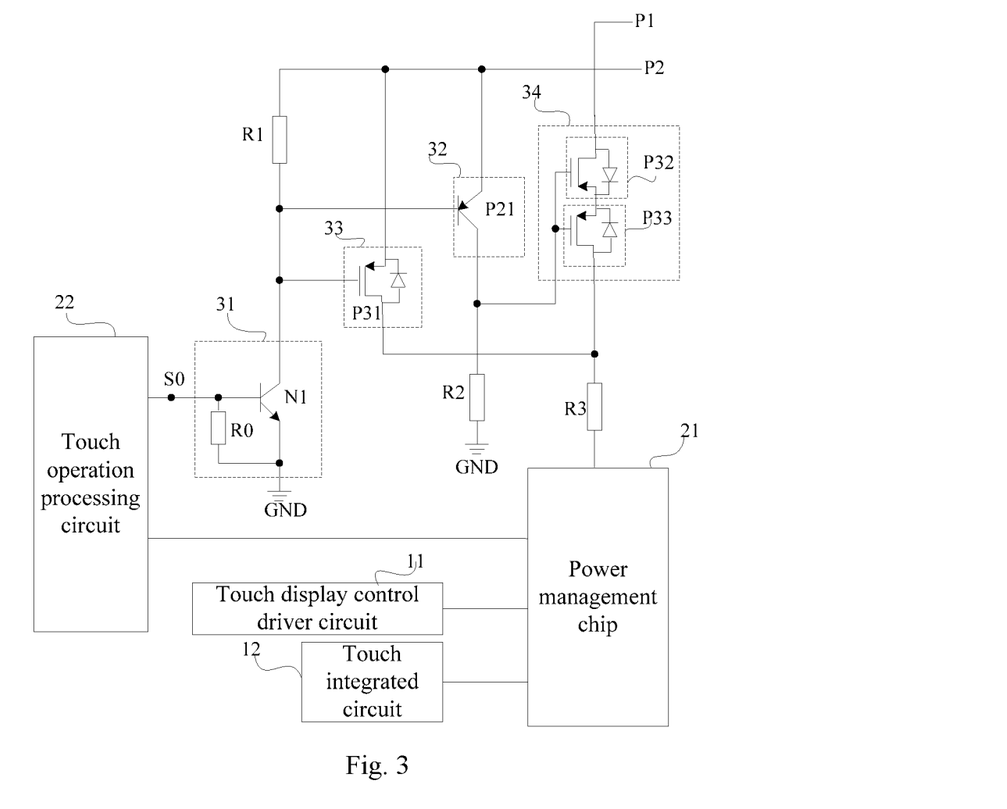
FIG. 3 is a structural diagram of a touch display device according to at least one embodiment of the present disclosure.

As shown in FIG. 3, on the basis of the touch display device according to at least one embodiment as shown in FIG. 2, the first control circuit 31 includes a first control transistor N1 and a first control resistor R0;

a base electrode of the first control transistor N1 is electrically connected to the control signal output terminal S0, and a collector electrode of the first control transistor N1 is electrically connected to the control terminal of the second control circuit, the control terminal of the third control circuit and the first terminal of the first resistor R1; an emitter electrode of the first control transistor N1 is electrically connected to a ground terminal GND;

the second control circuit 32 includes a second control transistor P21;

a base electrode of the second control transistor P21 is electrically connected to the collector electrode of N1, an emitter electrode of P21 is electrically connected to the second power supply terminal P2, a collector electrode of P21 is electrically connected to the control terminal of the fourth control circuit, and the collector electrode of P21 is electrically connected to the ground terminal GND via the second resistor R2;

the third control circuit 33 includes a third control transistor P31;

a gate electrode of the third control transistor P31 is electrically connected to the collector electrode of N1, a source electrode of P31 is electrically connected to the second power supply terminal P2, and a drain electrode of P31 is electrically connected to the power management chip 21 via the third resistor R3;

the fourth control circuit 34 includes a fourth control transistor P32 and a fifth control transistor P33; and where a gate electrode of the fourth control transistor P32 and a gate electrode of the fifth control transistor P33 are electrically connected to the collector electrode of P21; a drain electrode of P32 is electrically connected to the first power supply terminal P1, a source electrode of P32 is electrically connected to a source electrode of P33, and a drain electrode of P33 is electrically connected to the power management chip 21 via the third resistor R3.

In at least one embodiment as shown in FIG. 3, N1 is an NPN-type triode, P21 is a PNP-type triode, and each of P31, P32 and P33 is a PMOS transistor, but the present disclosure is not limited thereto.

In at least one embodiment as shown in FIG. 3, the gate electrode of P31 is electrically connected to the drain electrode of P31 via the first resistor R1 to form a diode-connected MOS transistor; and P32 and P33 are cascaded to enable a more thorough switching of P32 and P33 to prevent unintended power supplying.

In at least one embodiment as shown in FIG. 3, a control diode may also be provided between P1 and the fourth control circuit 34, an anode of the control diode is electrically connected to P1, and a cathode of the control diode is electrically connected to the drain electrode of P32, but the present disclosure is not limited thereto.

When the touch display device according to at least one embodiment of the present disclosure as shown in FIG. 3 is in operation, in a case where the touch display device is in the sleep state, the touch operation processing circuit 22 provides a high voltage signal to S0, N1 is turned on, the base electrode of P21 is electrically connected to the ground terminal GND, P21 is turned on, the gate electrode of P32 and the gate electrode of P33 are connected to the second operating voltage provided by the second power supply terminal P2, P32 and P33 are turned off, P31 is turned on, and P2 supplies power to the power management chip 21 via P31 and R3; the power management chip 21 provides the operating voltage to the touch operation processing circuit 22, to the touch display control driver circuit 11 and to the touch integrated circuit 12, so that the touch display device is capable of detecting a touch event; and in a case where the touch display device in the sleep state is touched, the touch operation processing circuit 22 provides a low voltage signal to S0, N1 is turned off, the base electrode of P21 and the gate electrode of P31 are both electrically connected to P2 via a resistor, P2 provides a positive voltage signal (P2 may provide a voltage signal of 3.3 V, for example), both P21 and P31 are turned off so as to cut off the connection between P2 and the power management chip 21, the gate electrode of P32 and the gate electrode of P33 are both electrically connected to the ground terminal GND via R2; both P32 and P33 are turned on, and P1 provides power for the power management chip 21.

Figure 4:
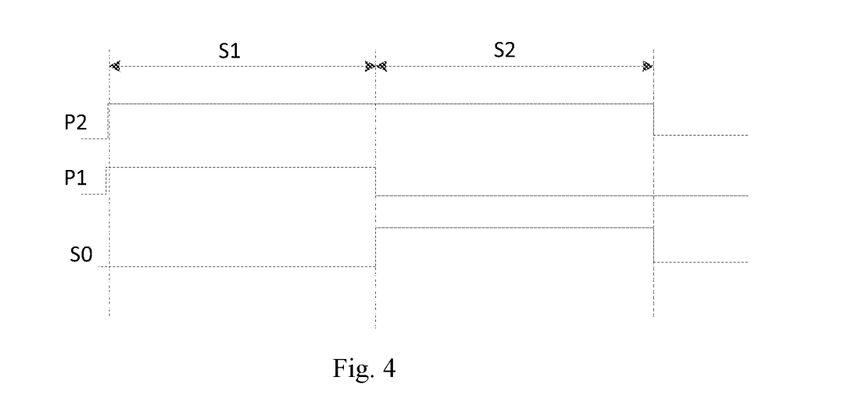
FIG. 4 is an operation timing diagram of the touch display device in the at least one embodiment of the present disclosure as shown in FIG. 3.

As shown in FIG. 4, when the touch display device according to at least one embodiment of the present disclosure as shown in FIG. 3 is in operation, in a normal operating stage 51, the touch display device performs a normal display and touch control (namely, the touch display device is in the normal operating state); the touch operation processing circuit 22 provides a low voltage signal to S0, both P1 and P2 may provide voltage signals of 3.3 V, P1 serves as a power supply source to supply power to the power management chip 21, and P1 serves as a core power supply; and in a sleep stage S2, the touch display device is in the sleep state, the touch operation processing circuit 22 provides a high voltage signal to S0, the voltage signal provided by P1 is a low potential, while P2 continues to work, P2 serves as an operating power supply under the sleep state and supplies power to the power management chip 21, and the power management chip 21 provides an operating voltage to the touch operation processing circuit 22, to the touch display control driver circuit 11 and to the touch integrated circuit 12, so that the touch control detection can be performed as normal when the touch display device is in the sleep state.

In at least one embodiment of the present disclosure, the power management chip 21 provides a basic logic voltage AVDD;

the power management chip 21 provides an operating voltage to the touch operation processing circuit 22 (the operating voltage may be selected according to actual situations, for example, the operating voltage may be 1.2 V or 0.9 V, but the present disclosure is not limited thereto); the power management chip 21 supplies power to an auxiliary circuit in the chip 50;

the power management chip 21 provides the touch display control driver circuit 11 with a voltage signal of 1.2 V, a voltage signal of 1.5 V, or a voltage signal of 1.8 V, but the present disclosure is not limited thereto; and the power management chip 21 provides the touch integrated circuit 12 with a voltage signal of 2.5 V, a voltage signal of 3.3 V, or a voltage signal of 1.8 V, but the present disclosure is not limited thereto.

Figure 5:
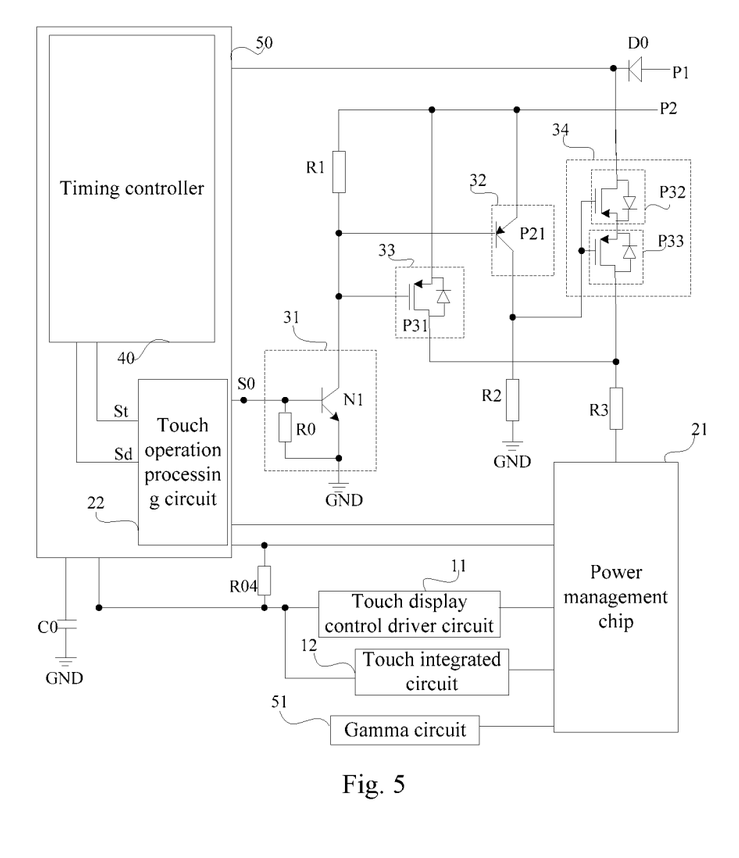
FIG. 5 is a circuit diagram of a touch display device according to at least one embodiment of the present disclosure.

As shown in FIG. 5, on the basis of the touch display device according to at least one embodiment as shown in FIG. 3, the touch display device further includes a timing controller 40; and the timing controller 40 and the touch operation processing circuit 22 are integrated on a single chip 50, so as to reduce the quantity of chips used in the touch display device;

P1 is electrically connected to an anode of a control diode DO, a cathode of the control diode DO is electrically connected to the timing controller 40 in the chip 50, the cathode of the control diode DO is also electrically connected to the drain electrode of P32, and P1 supplies power to the timing controller 40 when the touch display device performs a normal display and touch control; and the timing controller 40 provides a touch synchronization signal St and a display synchronization signal Sd to the touch operation processing circuit 22.

In FIG. 5, the reference CO denotes a capacitor, the reference R04 denotes a second control resistor, the reference 51 denotes a gamma circuit, and the power management chip 21 supplies power to the gamma circuit 51.

In the touch display device according to at least one embodiment of the present disclosure as shown in FIG. 5, the control diode DO is used to provide reverse cut-off to prevent a reverse current burn-up caused by the voltage signal of 0 V provided by P1 when the touch display device is in the sleep state.

In the touch display device according to at least one embodiment of the present disclosure as shown in FIG. 5, the touch display control driver circuit 11, the touch integrated circuit 12 and the touch operation processing circuit 22 are electrically connected to each other.

At least one embodiment of the present disclosure further provides a power supply control method, applied to the touch display device as described above, the power supply control method includes:

providing, by a power management chip, an operating voltage to a touch operation processing circuit, a touch display control driver circuit and a touch integrated circuit;

providing, by the touch operation processing circuit when the touch display device is in a sleep state, a first control signal to a control signal output terminal, so as to enable a power supply control circuit to supply power to the power management chip via a second power supply terminal under control of the first control signal; and providing, by the touch operation processing circuit when the touch display device is in the sleep state and the touch display panel is touched, a second control signal to the control signal output terminal, so as to enable the power supply control circuit to supply power to the power management chip via a first power supply terminal under control of the second control signal.

In the power supply control method according to at least one embodiment of the present disclosure, when the touch display device is in the sleep state, the power supply control circuit is controlled to supply power to the power management chip via the second power supply terminal, and the power management chip provides the touch display control driver circuit, the touch integrated circuit and the touch operation processing circuit with the operating voltage, so that a touch event can be detected even if the touch display device is in the sleep state, and a wake-up by touching under the sleep state can be achieved.

In particular implementation, the power supply control method according to at least one embodiment of the present disclosure may further include:

providing, by the touch operation processing circuit when the touch display device is in a normal operating state, the second control signal to the control signal output terminal, so as to enable the power supply control circuit to supply power to the power management chip via the first power supply terminal under control of the second control signal.

In at least one embodiment of the present disclosure, the touch display device may further include a system terminal, and the power supply control method may further include:

providing, by the first power supply terminal when the touch display device is in the sleep state, a voltage signal of 0 V;

provides, by the touch operation processing circuit when the touch display device is in the sleep state and the touch display panel is touched, a wake-up prompt signal to the system terminal; and controlling, by the system terminal upon receiving the wake-up prompt signal, the first power supply terminal to provide a first operating voltage.

In at least one embodiment of the present disclosure, when the touch display device is in the sleep state, the first power supply terminal does not work, and the first power supply terminal provides the voltage signal of 0 V; when waking up the touch display device in the sleep state by touching, the wake-up prompt signal is provided by the touch operation processing circuit to the system terminal; and the system terminal control the first power supply terminal to normally provide the first operating voltage in response to the wake-up prompt signal.

The display device provided by at least one embodiment of the present disclosure may be a mobile phone, a tablet computer, a television, a display, a notebook computer, a digital photo frame, a navigator, or any product or component with functions of display and touch control.

While the foregoing illustrates specific embodiments of the present disclosure, it will be understood that various modifications and adaptations may be made by those skilled in the art without departing from the principles of the disclosure, and such modifications and adaptations fall within the protection scope of the disclosure.

What is claimed is:

1. A touch display device, comprising a touch display panel, a touch display control driver circuit, a touch integrated circuit, a power management chip, and a touch operation processing circuit, the touch display device further comprising a power supply module; the power supply module comprising a first power supply terminal, a second power supply terminal, and a power supply control circuit;
    wherein the power management chip provides the touch operation processing circuit, the touch display control driver circuit and the touch integrated circuit with an operating voltage;
    a control terminal of the power supply control circuit is electrically connected to a control signal output terminal of the touch operation processing circuit;
    the touch operation processing circuit is configured for providing a first control signal to the control signal output terminal when the touch display device is in a sleep state, to enable the power supply control circuit to supply power to the power management chip via the second power supply terminal under control of the first control signal; and the touch operation processing circuit is further configured for providing a second control signal to the control signal output terminal when the touch display device is in the sleep state and the touch display panel is touched, to enable the power supply control circuit to supply power to the power management chip via the first power supply terminal under control of the second control signal.

2. The touch display device according to claim 1, wherein the first power supply terminal is configured for providing a voltage signal of 0 V when the touch display device is in the sleep state; and the touch display device further comprises a system terminal;
    the touch operation processing circuit is configured for providing a wake-up prompt signal to the system terminal when the touch display device is in the sleep state and the touch display panel is touched; and
    the system terminal controls the first power supply terminal to provide a first operating voltage upon reception of the wake-up prompt signal.

3. The touch display device according to claim 2, wherein the touch operation processing circuit is further configured for providing the second control signal to the control signal output terminal when the touch display device is in a normal operating state, to enable the power supply control circuit to supply power to the power management chip via the first power supply terminal under control of the second control signal;
    wherein when the touch display device is in the normal operating state, the touch display device performs both displaying and touch controlling normally.

4. The touch display device according to claim 2, further comprising a timing controller; and
    wherein the touch operation processing circuit and the timing controller are integrated on a single chip.

5. The touch display device according to claim 1, wherein the touch operation processing circuit is further configured for providing the second control signal to the control signal output terminal when the touch display device is in a normal operating state, to enable the power supply control circuit to supply power to the power management chip via the first power supply terminal under control of the second control signal;
    wherein when the touch display device is in the normal operating state, the touch display device performs both displaying and touch controlling normally.

6. The touch display device according to claim 5, wherein the power supply control circuit comprises a first resistor, a second resistor, a third resistor, a first control circuit, a second control circuit, a third control circuit, and a fourth control circuit, wherein,
    a control terminal of the first control circuit is electrically connected to the control signal output terminal; a first terminal of the first control circuit is electrically connected to a control terminal of the second control circuit, a control terminal of the third control circuit and a first terminal of the first resistor; a second terminal of the first resistor is electrically connected to the second power supply terminal; a second terminal of the first control circuit is electrically connected to a first voltage terminal; the first control circuit is configured for controlling the control terminal of the second control circuit to be connected to the first voltage terminal, and controlling the control terminal of the third control circuit to be connected to the first voltage terminal when the control signal output terminal outputs the first control signal; the first control circuit is further configured for controlling the control terminal of the second control circuit to be disconnected from the first voltage terminal and controlling the control terminal of the third control circuit to be disconnected from the first voltage terminal when the control signal output terminal outputs the second control signal;
    a first terminal of the second control circuit is electrically connected to the second power supply terminal, a second terminal of the second control circuit is electrically connected to a control terminal of the fourth control circuit, and the second terminal of the second control circuit is electrically connected to a second voltage terminal via the second resistor, the second control circuit is configured for controlling the second power supply terminal to be connected to the control terminal of the fourth control circuit when the control terminal of the second control circuit is in connection with the first voltage terminal, and the second control circuit is further configured for controlling the second power supply terminal to be disconnected from the control terminal of the fourth control circuit when the control terminal of the second control circuit is disconnected from the first voltage terminal;
    a first terminal of the third control circuit is electrically connected to the second power supply terminal, and a second terminal of the third control circuit is electrically connected to the power management chip via the third resistor, the third control circuit is configured for controlling to supply power to the power management chip via the second power supply terminal when the control terminal of the third control circuit is in connection with the first voltage terminal, and the third control circuit is further configured for controlling the second power supply terminal to be disconnected from the power management chip when the control terminal of the third control circuit is disconnected from the first voltage terminal; and a first terminal of the fourth control circuit is electrically connected to the first power supply terminal, and a second terminal of the fourth control circuit is electrically connected to the power management chip via the third resistor, the fourth control circuit is configured for controlling the first power supply terminal to be disconnected from the power management chip when the control terminal of the fourth control circuit is electrically connected to the second power supply terminal, and the fourth control circuit is further configured for controlling to supply power to the power management chip via the first power supply terminal when the control terminal of the fourth control circuit is disconnected from the second power supply terminal.

7. The touch display device according to claim 6, wherein the first control circuit comprises a first control transistor and a first control resistor;

a control terminal of the first control transistor is electrically connected to the control signal output terminal; a first electrode of the first control transistor is electrically connected to the control terminal of the second control circuit, the control terminal of the third control circuit and the first terminal of the first resistor; and a second electrode of the first control transistor is electrically connected to the first voltage terminal.

8. The touch display device according to claim 6, wherein the second control circuit comprises a second control transistor; and a control electrode of the second control transistor is electrically connected to the first terminal of the first control circuit, a first electrode of the second control transistor is electrically connected to the second power supply terminal, a second electrode of the second control transistor is electrically connected to the control terminal of the fourth control circuit, and the second electrode of the second control transistor is electrically connected to the second voltage terminal via the second resistor.

9. The touch display device according to claim 6, wherein the third control circuit comprises a third control transistor; and a control electrode of the third control transistor is electrically connected to the first terminal of the first control circuit, a first electrode of the third control transistor is electrically connected to the second power supply terminal, and a second electrode of the third control transistor is electrically connected to the power management chip via the third resistor.

10. The touch display device according to claim 6, wherein the fourth control circuit comprises a fourth control transistor and a fifth control transistor, wherein a control electrode of the fourth control transistor and a control electrode of the fifth control transistor are electrically connected to the second terminal of the second control circuit; a first electrode of the fourth control transistor is electrically connected to the first power supply terminal, a second electrode of the fourth control transistor is electrically connected to a first electrode of the fifth control transistor, and a second electrode of the fifth control transistor is electrically connected to the power management chip via the third resistor.

11. The touch display device according to claim 1, further comprising a timing controller; and wherein the touch operation processing circuit and the timing controller are integrated on a single chip.

12. A power supply control method, applied to the touch display device according to claim 1, the power supply control method comprising:

providing, by the power management chip, the operating voltage to the touch operation processing circuit, the touch display control driver circuit and the touch integrated circuit;

providing, by the touch operation processing circuit, the first control signal to the control signal output terminal when the touch display device is in the sleep state, to enable the power supply control circuit to supply power to the power management chip via the second power supply terminal under control of the first control signal; and providing, by the touch operation processing circuit, the second control signal to the control signal output terminal when the touch display device is in the sleep state and the touch display panel is touched, to enable the power supply control circuit to supply power to the power management chip via the first power supply terminal under control of the second control signal.

13. The power supply control method according to claim 12, wherein the touch display device further comprises a system terminal, and the power supply control method further comprises:

providing, by the first power supply terminal, a voltage signal of 0 V when the touch display device is in the sleep state;

providing, by the touch operation processing circuit, a wake-up prompt signal to the system terminal when the touch display device is in the sleep state and the touch display panel is touched; and controlling, by the system terminal, the first power supply terminal to provide a first operating voltage upon reception of the wake-up prompt signal.

14. The power supply control method according to claim 13, further comprising:

providing, by the touch operation processing circuit, the second control signal to the control signal output terminal when the touch display device is in a normal operating state, to enable the power supply control circuit to supply power to the power management chip via the first power supply terminal under control of the second control signal;

wherein when the touch display device is in the normal operating state, the touch display device performs both displaying and touch controlling normally.

15. The power supply control method according to claim 12, further comprising:

providing, by the touch operation processing circuit, the second control signal to the control signal output terminal when the touch display device is in a normal operating state, to enable the power supply control circuit to supply power to the power management chip via the first power supply terminal under control of the second control signal;

wherein when the touch display device is in the normal operating state, the touch display device performs both displaying and touch controlling normally.

* * * * *